C. G. RICHARDSON.
MEASURING INDICATOR.
APPLICATION FILED JUNE 9, 1916.
1,357,903.
Patented Nov. 2, 1920.
2 SHEETS—SHEET 1.
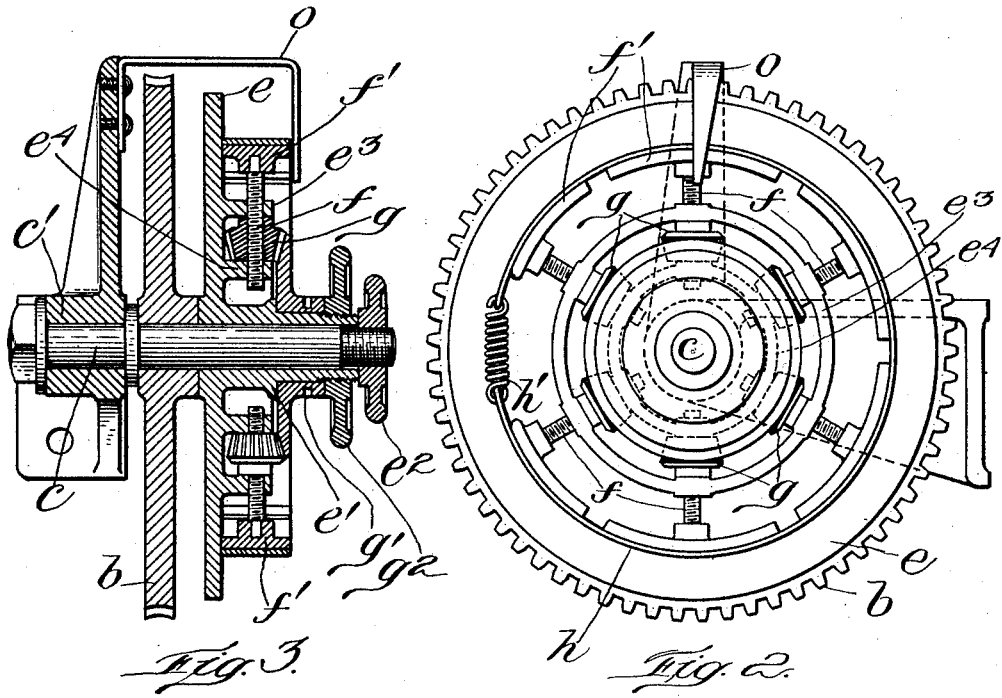
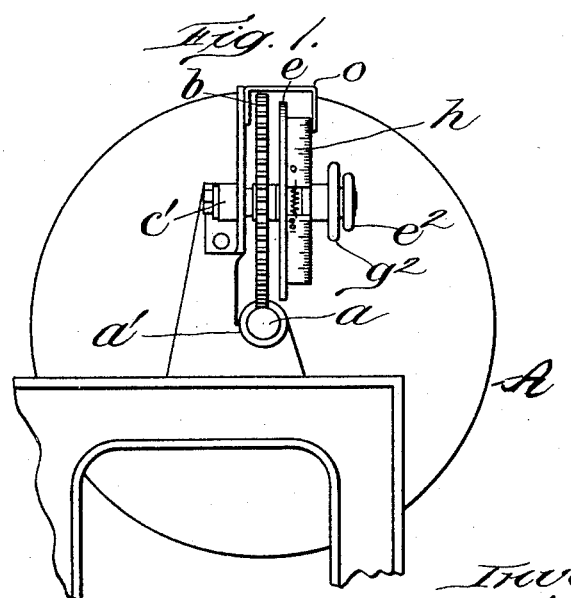
Inventor:
C. G. Richardson
by Geo. N. Goddard, Atty

C. G. RICHARDSON.
MEASURING INDICATOR.
APPLICATION FILED JUNE 9, 1916.

1,357,903.

Patented Nov. 2, 1920.
2 SHEETS—SHEET 2.

Inventor:
C. G. Richardson
by
Geo. N. Goddard, Atty.

UNITED STATES PATENT OFFICE.

CHARLES G. RICHARDSON, OF SPRINGFIELD, VERMONT, ASSIGNOR TO PARKS & WOOLSON MACHINE COMPANY, OF SPRINGFIELD, VERMONT, A CORPORATION OF VERMONT.

MEASURING-INDICATOR.

1,357,903.

Specification of Letters Patent.

Patented Nov. 2, 1920.

Application filed June 9, 1916. Serial No. 102,653.

*To all whom it may concern:*

Be it known that I, CHARLES G. RICHARDSON, citizen of the United States, and resident of Springfield, Vermont, have invented certain new and useful Improvements in Measuring-Indicators, of which the following is a specification.

This invention relates to measuring indicators, and is particularly intended to provide a measuring indicator or scale that shall be adjustable to compensate for variations in measurement of materials having different degrees of elasticity or stretch or which vary in respect to the degree of frictional engagement with the measuring drum with which they come in contact. Such an adjustable indicator is particularly useful in machines for measuring cloth and may be used advantageously wherever for any reason an accurate and certain adjustment of the measuring indicator is required. The principal form of the invention as shown and described herein was originally described and claimed in my application for Letters Patent relating to improvements in cloth measuring machines filed May 14, 1915, Serial No. 28098, and was withdrawn from that application and included herein in response to a requirement for division.

The present invention consists generally in the combination with a suitable support of a cylindrical or peripheral graduated measuring scale so arranged as to be concentrically contractible toward or expansible away from the central axis of its support in order that each subdivision of the scale may be caused to subtend a larger or a smaller angle at the center in order to indicate respectively a decrease or an increase of measurement. This and other features of the invention will be particularly described and explained in this specification and will be defined in the claims annexed hereto.

In the accompanying drawings I have illustrated simple and convenient devices embodying the principles of this invention, in which—

Figure 1 is a side elevation showing the complete dial indicator applied in operative position to a rotating drum or cylinder such as is used in measuring cloth.

Fig. 2 is a front elevation of the complete dial wheel.

Fig. 3 is a vertical central cross section of the same.

Figure 4:
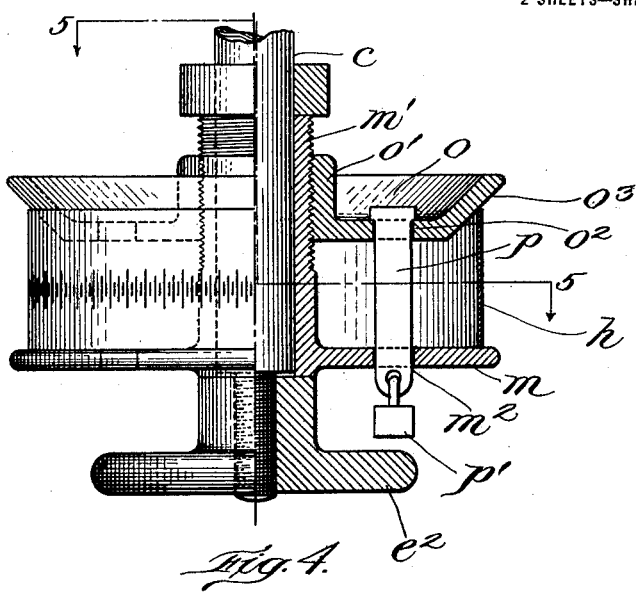
Fig. 4 is a horizontal view showing a modification, one-half being in plan and the other half in transverse central section.

In Fig. 1 is shown a well-known form of rough-surfaced measuring drum A rotatably supported by its central shaft $a$ in a suitable supporting frame. The shaft or journal $a$ is provided at one end with a worm $a'$ which intermeshes with a worm gear $b$ rotatably mounted on a short stud shaft $c$ which is secured in a suitable supporting bracket $c'$ designed to be bolted to the machine.

On the rotatable stud-shaft $c$ in front of the worm gear $b$ is mounted a rotatable dial-supporting wheel $e$ having an elongated hub $e'$ whose outer end is engaged by a nut $e^2$ in the form of a hand wheel which has screw-threaded engagement with the end of the stud shaft $c$ so as to force the wheel $e$ firmly against the hub of the worm gear $b$ in order that the dial-supporting wheel $e$ may be rotated by and in unison with the worm gear $b$ which serves as the actuating or driving member of the dial mechanism.

On its front or outer face the wheel $e$ is provided with a series of outer and inner concentrically disposed bearing lugs or flanges $e^3$, $e^4$, the outer lug or flange having radial apertures in radial alinement with a similar series of radial apertures formed in the inner lug or flange in order to receive radial spokes $f$ which support segmental shoes $f'$ to form a collapsible and expansible spider. Each spoke $f$ passes through the center of an adjusting pinion located between the flanges $e^3$ and $e^4$ and has screw-threaded engagement with such pinion so that by the rotation of the pinion in one direction the spoke is moved radially outward, while the reverse rotation of the pinion causes the spoke to move radially inward. Any convenient number of these spokes and pinions may be used to form the expansible and contractible spider for the graduated dial.

A beveled gear $g'$ is mounted upon the forward end of the hub $e'$ of the dial wheel so as to engage each and all of the adjusting pinions $g$. This beveled gear $g'$ forms the setting or adjusting member and is normally locked into fixed relationship with the wheel $e$ by means of a nut or hand wheel $g^2$ which has internal screw-threaded engagement with the end of the hub $e'$ so that when the setting gear $g'$ has been rotated to secure the desired adjustment of the spider and dial, it may be locked securely in position by turning up the nut $g^2$ firmly against it.

The dial member $h$ is preferably formed of a thin metallic ribbon which is marked with any desired number of graduations, according to the particular use for which the dial is intended, and is wrapped around the periphery of the segmental heads $f'$ carried by the radial spokes $f$ with its ends brought into juxtaposition, as shown in Fig. 2. The ends are drawn together by any convenient means, such as a contractile spring $h'$ hooked into the adjacent ends of the flexible dial strip which thus acts to keep the dial strip in close contact with the expansible and contractible spider throughout its various positions of adjustment.

Secured to any suitable fixed support, such as the bracket $c'$ is a pointer $o$ which is bent to bring its indicating edge close to the graduated marks forming the scale.

Let us suppose that in some given position of adjustment the spaces from zero to sixty on the indicator or dial exactly subtend or occupy an arc of 180 degrees. It will be clear then that if the dial is expanded so as to increase its radius by one-thirtieth, the circumference or semi-circumference of the enlarged circle will be increased in like proportion, and an arc of 180 degrees on this circle will then measure sixty-two spaces on the dial instead of sixty spaces, as before. If each space is intended to correspond to a yard, it is obvious that the same amount of rotation of the measuring drum A, that before such expansion of the spider measured sixty yards, will now measure sixty-two yards. In other words, each successive expansion of the dial correspondingly increases the indicated measurement, and, conversely, each successive contraction of the dial will indicate a corresponding diminution of the indicated measurement.

By frictionally clamping the dial-supporting wheel $e$ to the driving gear $b$, it is possible to set the dial wheel with the dial at zero point whenever desired without operating the machine. By clamping the dial setting gear $g'$ to the dial supporting wheel by means of the hand nut $g^2$, the desired adjustment can be readily effected.

Figure 5:
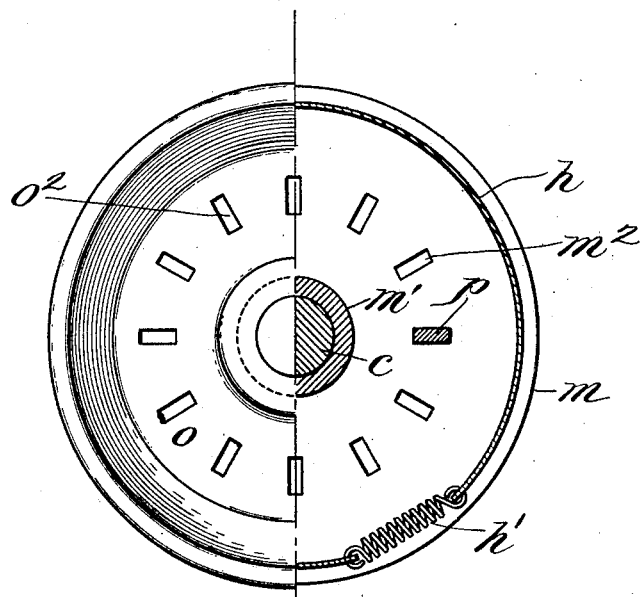
Fig. 5 is an end elevation one-half in central section on a plane indicated by broken line 5—5 of Fig. 4.

In the modified form of the invention shown in Figs. 4 and 5 the graduated flexible scale $h$ is held between two supporting heads $m$ and $o$. The head $m$ as shown is a disk-like member projecting from the central hub sleeve $m'$ which is screw-threaded to receive the internally screw-threaded hub $o'$ of the head $o$. The heads are each provided at frequent intervals with a series of concentric locking apertures $m^2$, $o^2$ adapted to receive a headed bolt or pin $p$ which may be secured for permanence and to prevent tampering by means of a padlock $p'$ passing through the perforated end of said pin.

At least one of the heads, in this case the head $o$, has its peripheral part inclined or beveled, as shown at $o^3$, to an angle of approximately forty-five degrees.

When it is desired to expand the measuring tape $h$ in order to increase the indicated measurement, the head $o$ is advanced by the screw-thread engagement toward the head $m$, thereby crowding all parts of the tape outward to an equal extent, the spring $h'$ acting just as in the other form of the device to keep the flexible tape $h$ yieldingly contracted upon the supporting or inclined flange $o^3$. The head $m$ receives the edgewise thrust of the tape while allowing the tape to expand or contract according to the movements of the adjusting member $o$. When the proper adjustment has been made the locking pin $p$ is inserted and secured to prevent rotative movement of the two heads in relation to each other. The clamping nut $e^2$ acts precisely as in the previously described form to lock the entire indicating wheel in any desired relationship to the driving gear $b$.

What I claim is:

1. An indicator device for measuring, embracing in combination an adjustable central supporting structure, and a flexible graduated measuring scale circumferentially supported thereon, and means for adjusting said supporting structure whereby the entire scale may be shifted to different concentric positions nearer to or farther from the center, and thus subtend different angles of the center, substantially as described.

2. An indicator device embracing in its construction an adjustable rotatable central supporting structure, a flexible graduated scale member concentrically supported thereon in circumferential relationship, said scale member being normally contracted upon said support and means for adjusting said support and scale member to cause the different portions of said scale equally to approach or recede from the central axis, substantially as described.

3. An indicator device for measuring purposes embracing a graduated continuous measuring scale strip and rotary supporting means upon which said strip is circumferentially and loosely mounted, said supporting means being adjustable in order to shift said measuring scale strip concentrically toward or away from the central axis of said support, substantially as described.

4. A compensating measuring device embracing in combination an expansible and contractible rotatable spider, and a flexible graduated rim member forming a continuous graduated scale encircling said spider and adjustable nearer to or farther from the axle of said spider by the contraction and the expansion respectively of the spider while preserving its circumferential relationship to the spider, substantially as described.

5. An indicator device for measuring purposes embracing a rotatable supporting member, a peripheral graduated measuring scale carried thereby, and means whereby the said measuring scale may be adjusted to a position nearer to or farther from the center in order to vary the effective measurement indicated by the graduations thereof, substantially as described.

6. The combination with a fixed pointer, of a rotary wheel, an adjustable dial scale carried thereby adjacent to said pointer, and adjusting means for adjusting said scale nearer to or farther from the axis of rotation, substantially as described.

7. The combination of a rotary member, an expansible and contractible sectional spider mounted thereon, means for adjusting the spider sections simultaneously toward or away from their common center, an encircling flexible graduated scale band surrounding said spider and adjustable therewith, substantially as described.

8. The combination of a rotary supporting member, an expansible and contractible spider mounted thereon, means for expanding and contracting said spider, a flexible measuring scale encircling said spider, and means for maintaining said scale in close contact with said spider in the various positions of adjustment, substantially as described.

9. The combination with a rotary driving member, a rotary scale-supporting member adjustably connected therewith, an annular scale member mounted upon said rotary supporting member to have adjustment toward or away from the axis of rotation, substantially as described.

10. The combination of a central supporting shaft, a driving gear rotatably mounted thereon, a scale-supporting member, means for frictionally clamping said scale-supporting member to the driving gear, an annular graduated band forming a graduated scale mounted concentrically on said supporting member, adjusting means whereby the dial may be moved toward or away from the central axis, and means for securing the adjusting mechanism in any desired position of adjustment, substantially as described.

11. A supporting wheel provided with a single bore for receiving its supporting shaft and formed with inner and outer flanges, a series of radial spokes passed through said flanges, a series of adjusting pinions mounted between said flanges and having operative connection with the radial spokes to move them outwardly or inwardly when said pinions are rotated, an adjustable gear mounted on said wheel to engage and actuate said pinions for adjustment, means for locking said gear in fixed relationship to said wheel, segmental heads secured to the outer ends of said spokes, and a graduated scale forming a dial indicator encircling the edges of said spokes, substantially as described.

12. The combination with a supporting wheel, an encircling graduated measuring scale arranged concentrically with the axis of rotation of said wheel, and adjusting means by which the radial distance of said scale from the central axis may be varied in order to vary the measurement indicated by said scale, substantially as described.

13. An expansible and contractible drum embracing in its construction a rotatable supporting structure, a flexible peripheral member comprising a continuous strip of spring metal encircling the central axis of rotation, and supported adjustably in relation to said axis by the supporting member, and adjusting means whereby all parts of said peripheral strip are uniformly positioned nearer to or farther from the central axis, substantially as described.

In witness whereof, I have subscribed the above specification.

CHARLES G. RICHARDSON.

Witnesses:
B. L. NORTON,
ANNIE BEATRICE LOVELL.